US011099543B2

(12) United States Patent
Hirayama et al.

(10) Patent No.: US 11,099,543 B2
(45) Date of Patent: Aug. 24, 2021

(54) NUMERICAL CONTROLLER AND DEVICE INCLUDED IN INDUSTRIAL MACHINE

(71) Applicant: FANUC CORPORATION, Yamanashi (JP)

(72) Inventors: Nobuo Hirayama, Yamanashi (JP); Taku Sasaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/115,010

(22) Filed: Aug. 28, 2018

(65) Prior Publication Data
US 2019/0079495 A1 Mar. 14, 2019

(30) Foreign Application Priority Data

Sep. 12, 2017 (JP) .............................. JP2017-174495

(51) Int. Cl.
G05B 19/414 (2006.01)
G05B 19/408 (2006.01)
(Continued)

(52) U.S. Cl.
CPC .......... G05B 19/414 (2013.01); B25J 9/1602 (2013.01); G05B 19/408 (2013.01);
(Continued)

(58) Field of Classification Search
None
See application file for complete search history.

(56) References Cited

U.S. PATENT DOCUMENTS

2017/0034023 A1\* 2/2017 Nickolov ............ H04L 43/0817

FOREIGN PATENT DOCUMENTS

CN 1781064 5/2006
CN 102047191 5/2011
(Continued)

OTHER PUBLICATIONS

Notification of Reasons for Refusal dated Jul. 30, 2019 in Japanese Application No. 2017-174495.
(Continued)

Primary Examiner — Mohammad Ali
Assistant Examiner — Saad M Kabir
(74) Attorney, Agent, or Firm — Wenderoth, Lind & Ponack, L.L.P.

(57) ABSTRACT

An object is to provide a numerical controller and a device included in an industrial machine which manage a control program in the device included in the industrial machine and can reduce the operational burden during the updating of the control programs related to the device. A numerical controller which is connected to a motor drive device so as to be able to communicate therewith and which controls the motor drive device, includes: a program management storage unit which stores a control program that is written into the motor drive device and is executable; a program writing unit which writes the control program stored in the program management storage unit; a data acquisition portion which acquires from the motor drive device a control program that is already stored in the motor drive device; and a storage control unit which stores the acquired control program in the program management storage unit.

8 Claims, 6 Drawing Sheets

(51) Int. Cl.
  *B25J 9/16* (2006.01)
  *G05B 19/418* (2006.01)
  *G06F 8/65* (2018.01)
  *G05B 19/409* (2006.01)
  *G06F 8/71* (2018.01)

(52) U.S. Cl.
  CPC ............ *G05B 19/418* (2013.01); *G06F 8/65* (2013.01); *G05B 19/409* (2013.01); *G05B 2219/23301* (2013.01); *G05B 2219/23304* (2013.01); *G06F 8/71* (2013.01)

(56) References Cited

FOREIGN PATENT DOCUMENTS

| CN | 106897086 | 6/2017 |
|---|---|---|
| DE | 103 53 052 | 6/2005 |
| DE | 10 2006 028 797 | 12/2007 |
| JP | 6-289916 | 10/1994 |
| JP | 8-263125 | 10/1996 |
| JP | 2003-15895 | 1/2003 |
| JP | 2004-252853 | 9/2004 |
| JP | 2005-292949 | 10/2005 |
| JP | 2008-139972 | 6/2008 |
| JP | 2010-224923 | 10/2010 |
| WO | 2010/089951 | 8/2010 |

OTHER PUBLICATIONS

Office Action dated Mar. 27, 2020 in Chinese Patent Application No. 201811052998.4.

Office Action dated Mar. 29, 2021 in German Patent Application No. 10 2018 215 341.8.

\* cited by examiner

FIG. 4
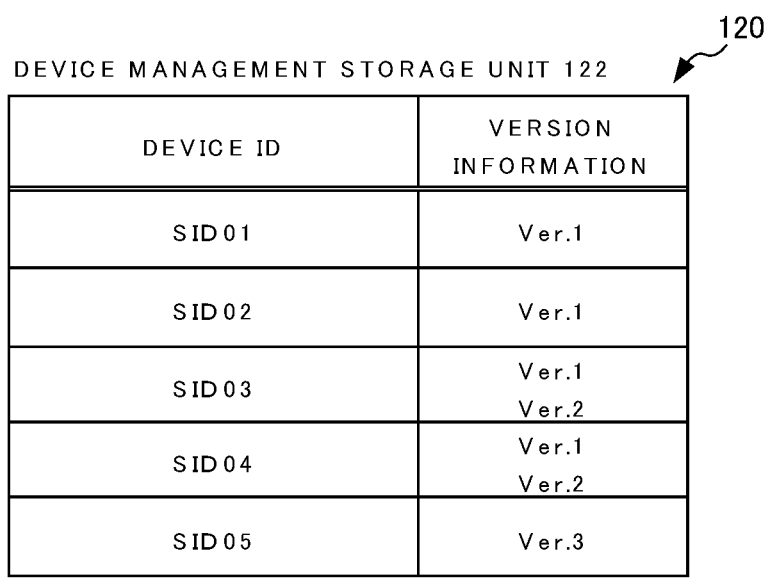
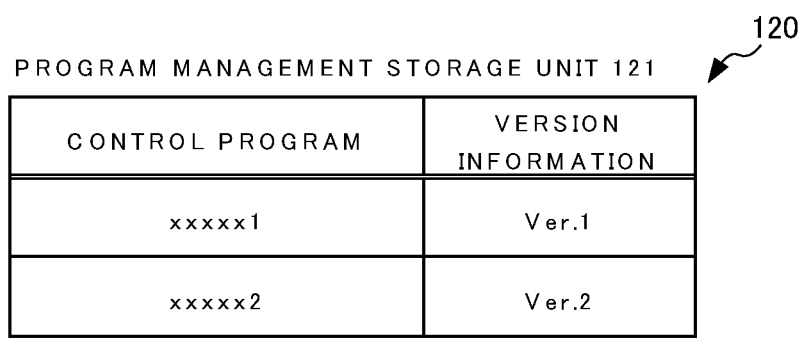

NUMERICAL CONTROLLER AND DEVICE
INCLUDED IN INDUSTRIAL MACHINE

This application is based on and claims the benefit of priority from Japanese Patent Application No. 2017-174495, filed on 12 Sep. 2017, the content of which is incorporated herein by reference.

BACKGROUND OF THE INVENTION

Field of the Invention

The present invention relates to a numerical controller and a device included in an industrial machine.

Related Art

Various types of programs including control software for controlling motors and the like operate in motor drive devices incorporated in machine tools, industrial robots and the like, for example. Likewise, various types of programs including control software for controlling laser oscillators and the like operate in laser machines incorporated in machine tools and the like. As described above, in various types of machine tools, industrial robots and the like, devices such as the motor drive devices and the laser machines described above are incorporated as constituent elements thereof. The same is true not only for the machine tools and the industrial robots but also, for example, various machines such as service robots, forging press machines, and injection molding machines. Conventionally, in order to update various types of programs which are installed in devices included in machines such as the machine tools and the industrial robots described above (including various machines such as service robots, forging press machines, and injection molding machines), an operator directly connects, for example, an external personal computer (PC) to the devices or the machines such as the machine tool and the industrial robot including the devices, and uses a tool in the PC to make a program storage unit included in the devices or the machines such as the machine tools and the industrial robots which include the devices perform the processing of writing various types of programs. Hence, for example, in cases where a plurality of the same devices or a plurality of machines such as the machine tools and the industrial robots including the same devices are present, it has been necessary to perform processing for writing various types of programs for each of the devices or for each of the machines such as the machine tools and the industrial robots, resulting in that it takes a long time to perform the operation and the operation becomes burdensome. In order to cope with this problem, Patent Document 1 discloses a technology for updating software installed in an industrial robot via a network from a host computer.

Patent Document 1: Japanese Unexamined Patent Application, Publication No. H08-263125

SUMMARY OF THE INVENTION

However, in the system disclosed in Patent Document 1, although it is stated as sufficient to store the latest program in the host computer, in cases where the latest program has already been installed in one industrial robot, said latest program installed in the one industrial robot could not be reflected on other industrial robots.

An object of the present invention is to provide a numerical controller and devices included in machines such as machine tools and industrial robots which manage various types of programs including control software in the devices included in the machines such as the machine tools and the industrial robots (including various machines such as service robots, forging press machines, and injection molding machines) as described previously and can reduce the operational burden during the updating of various types of programs including the control software related to the devices. Hereinafter, in the following Specification, Claims, Abstract, and Drawings, for ease of description, the machines such as the machine tools and the industrial robots (including various machines such as service robots, forging press machines, and injection molding machines) as described previously are referred to as "industrial machines," and the devices included in the industrial machines are referred to as "devices" unless otherwise noted. Also for ease of description, various types of programs including the control software in the devices are referred to as "control programs".

(1) A numerical controller (for example, a "numerical controller 100" described later), which is connected to a device (for example, a "motor drive device 200" described later) included in an industrial machine so as to be able to communicate therewith and controls the device, includes: a program management storage unit (a "program management storage unit 121" described later, for example) which stores a control program (a "control program" described later, for example) that is written into the device and is executable; a program writing unit (a "program writing unit 118" described later, for example) which writes the control program stored in the program management storage unit into a storage unit (a "program storage unit 221" described later, for example) of the device; a data acquisition unit (a "data acquisition unit 111" described later, for example) which acquires from the device a control program that is already stored in the device; and a storage control unit (a "storage control unit 112" described later, for example) which stores the control program acquired by the data acquisition unit in the program management storage unit.

(2) The numerical controller according to (1) (a "numerical controller 100" described later, for example) may further include: a comparison unit (a "comparison unit 114" described later, for example) which compares the control program (a "control program" described later, for example) acquired by the data acquisition unit and the control program previously stored in the program management storage unit, wherein the storage control unit may store the control program acquired by the data acquisition unit in the program management storage unit according to a result of the comparison by the comparison unit.

(3) In the numerical controller according to (2) (a "numerical controller 100" described later, for example), the program management storage unit may store version number information of the control program (a "control program" described later, for example) so as to associate the version number information with the control program, the data acquisition unit may further acquire version number information of the control program, and the comparison unit may compare the version number information.

(4) The numerical controller according to (3) (a "numerical controller 100" described later, for example) may further include: a display control unit (a "display control unit 115" described later, for example) which makes a display unit (a "display unit 130" described later, for example) display the version number information of the control program (a "control program" described later, for example) acquired by the data acquisition unit and the version number information of the control program previously stored in the program management storage unit; and a reception unit (a "reception unit 116" described later, for example) which receives a selection of the control program to be written through an input unit (an "input unit 140" described later, for example) based on the display of the display unit, wherein the program writing unit may write the control program corresponding to the selection received in the reception unit into the storage unit of the device.

(5) In the numerical controller according to (4) (a "numerical controller 100" described later, for example), the numerical controller may be connected to a plurality of the devices (a "motor drive devices 200-1 to 200-n" described later, for example) so as to be able to communicate therewith, the display control unit may make the display unit further display a name of the device along with the version number information of the control program (a "control program" described later, for example) acquired by the data acquisition unit, the reception unit may receive the selection of the control program to be written and a selection of the device into which the selected control program to be written is written through the input unit, and the program writing unit may write the control program to be written corresponding to the selection received in the reception unit into the storage unit of the device received in the reception unit.

(6) In the numerical controller according to (5) (a "numerical controller 100" described later, for example), the program management storage unit may be associated with type information of the device capable of executing the control program (a "control program" described later, for example), and the display control unit may make the display unit further display the type information of the device along with the version number information of the control program previously stored in the program management storage unit.

(7) A device (a "motor drive device 200" described later, for example) included in an industrial machine and connected to the numerical controller (a "numerical controller 100" described later, for example) according to any one of (1) to (6) so as to be able to communicate therewith, which includes: a writing permission unit (a "writing permission unit 212" described later, for example) which permits the storage unit to write the received control program (a "control program" described later, for example) according to the reception of the control program from the numerical controller; and a data feed unit (a "data feed unit 211" described later, for example) which feeds out the control program stored in the storage unit according to a request from the numerical controller.

(8) In the device according to (7) (a "motor drive device 200" described later, for example), the writing permission unit may permit the rewriting the control program already stored in the storage unit (a "control program" described later, for example) to the received control program.

(9) In the device according to (7) (a "motor drive device 200" described later, for example), the storage unit may have such a storage size as to be able to store a plurality of the control programs ("control programs" described later, for example), the writing permission unit may permit not only the control program already stored in the storage unit but also the received control program to be written, and the device may include a switching unit (a "switching unit 213" described later, for example) which switches the control program to be executed to the control program that has been permitted to be written by the writing permission unit.

According to the present invention, it is possible to provide a numerical controller and devices included in industrial machines which manage the control programs in the devices included in the industrial machines such as the machine tools and the industrial robots as described previously and can reduce the operational burden during the updating of the control programs related to the devices.

BRIEF DESCRIPTION OF THE DRAWINGS

FIG. 4 is a diagram showing an example of a storage unit of the numerical controller of the present embodiment;

DETAILED DESCRIPTION OF THE INVENTION

Embodiment

Figure 1:
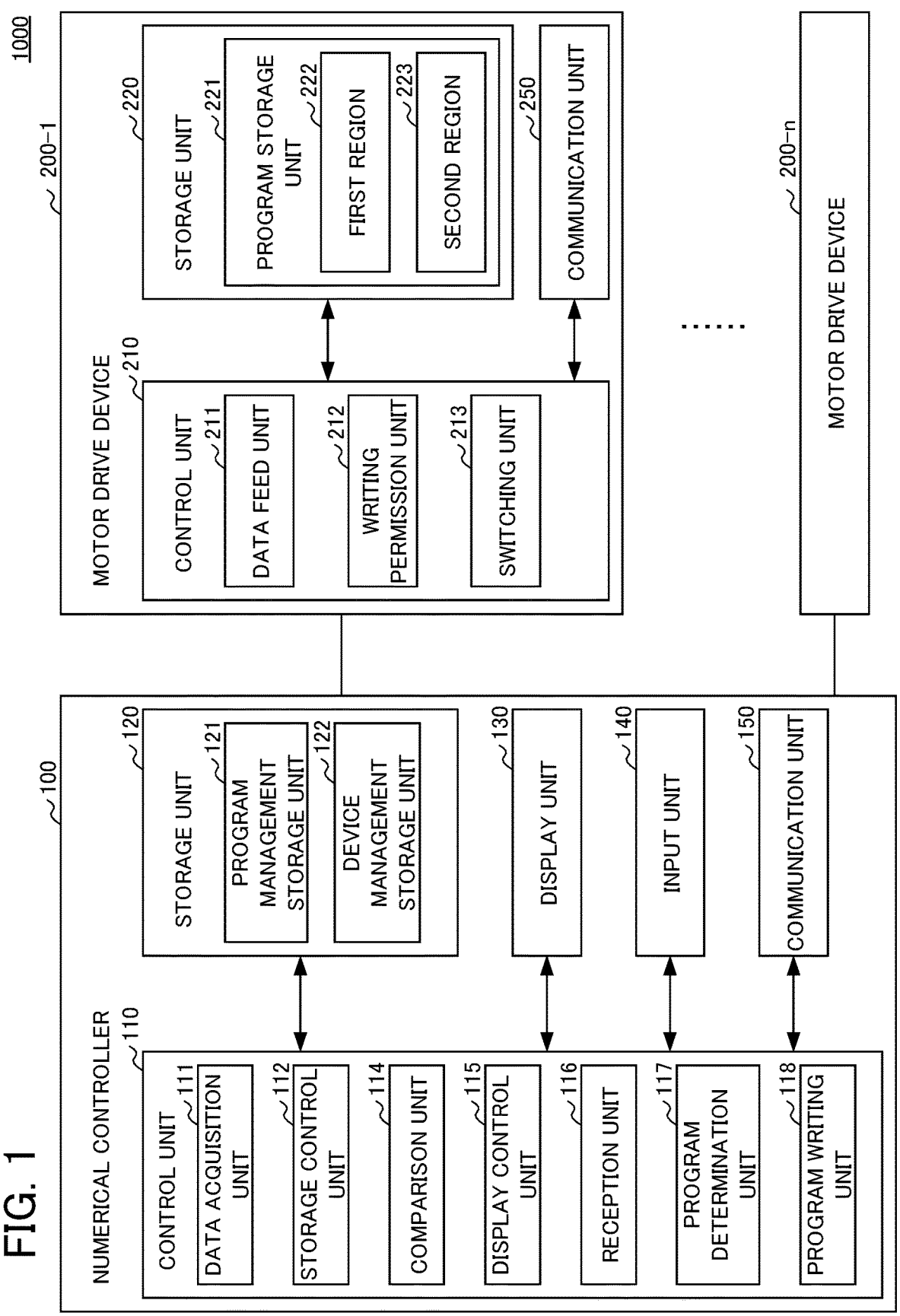
FIG. 1 is a basic configuration diagram and a functional block diagram of a numerical controller and motor drive devices in a numerical control system of the present embodiment.

The configuration of a numerical control system 1000 according to the present embodiment will be described. In the present embodiment, a motor drive device which is incorporated in a machine tool, an industrial robot or the like is illustrated as a "device included in an industrial machine"; however, it is not limited motor drive devices. The present embodiment can be applied to "devices included in industrial machines" other than the motor drive device (that is, devices included in machines such as machining units, or machine tools and industrial robots including a machining unit and the like (including various machines such as service robots, forging press machines, and injection molding machines)). FIG. 1 is a basic configuration diagram of the numerical control system 1000 of the present embodiment and a functional block diagram of a numerical controller 100 and motor drive devices 200. The numerical control system 1000 shown in FIG. 1 includes the numerical controller (CNC: Computerized Numerical Control) 100 and n motor drive devices 200-1 to 200-n. Here, n is an integer of 1 or more. Hence, in the following description, unless otherwise noted, the numerical controller 100 is applied to cases where one motor drive device is included and to cases where a plurality of motor drive devices are included.

In the numerical control system 1000, the numerical controller 100 manages various types of programs (hereinafter also referred to as a "control program") including control software for operating the motor drive devices 200-1 to 200-n. In a state where control programs of different versions (version numbers) are respectively installed to the motor drive devices 200-1 to 200-n within the numerical control system 1000, when it is desired, for example, to unify the control programs of the motor drive devices 200-1 to 200-n to the latest version, the numerical control system 1000 makes the numerical controller 100 update to the latest version the control program of the motor drive device 200, which has a control program that is not of the latest version installed therein, from among the motor drive devices 200-1 to 200-*n*. In the following description, in cases where the individual motor drive devices 200-1 to 200-*n* is not particularly specified, the motor drive devices 200-1 to 200-*n* are simply referred to as the motor drive device 200.

The numerical controller 100 is connected to a plurality of motor drive devices 200 such that the numerical controller 100 can communicate therewith. The numerical controller 100 and the plurality of motor drive devices 200 may be directly connected to each other through a connection interface or may be connected to each other through a network such as a LAN (Local Area Network). In the following description, the portions which are connected so as to be able to communicate with each other are also referred to as a connection interface. The numerical controller 100 is a device for controlling the individual motor drive devices 200 so as to make the individual motor drive devices 200 perform predetermined operations. The numerical controller 100 of the present embodiment writes the control program for the motor drive device 200 into the motor drive device 200. Furthermore, the numerical controller 100 manages a program body related to the control program of the motor drive device 200 and the version information of the control program.

The numerical controller 100 will be described first. With reference to FIG. 1, the numerical controller 100 includes a control unit 110, a storage unit 120, a display unit 130, an input unit 140 and a communication unit 150. The control unit 110 may be a CPU (central processing unit), and comprehensively controls the numerical controller 100 by executing various types of control programs which are stored in the storage unit 120 to control the numerical controller 100. In the present embodiment, the control unit 110 includes, as functional units based on the programs stored in the storage unit 120, a data acquisition unit 111, a storage control unit 112, a comparison unit 114, a display control unit 115, a reception unit 116, a program determination unit 117, and a program writing unit 118. The numerical controller 100 includes, in addition to these functional units, functional units which are specific to the numerical controller, but since they are known to a person skilled in the art, the description thereof will be omitted. Before the description of the individual functional units in the control unit 110, the storage unit 120 will first be described.

The storage unit 120 is, for example, a nonvolatile memory. The storage unit 120 includes, in addition to various types of control programs executed by the control unit 110, a program management storage unit 121 and a device management storage unit 122. FIG. 4 shows an outline of the storage in the storage unit 120. As shown in FIG. 4, the program management storage unit 121 is a storage region in which the program body of the control program and the version information of the control program are stored while being associated with each other. The program management storage unit 121 can store a plurality of control programs associated with version information. In this way, the program management storage unit 121 can perform generation management on the control programs. The program management storage unit 121 stores and manages control programs which are acquired by the data acquisition unit 111 described later and are stored in the individual motor drive devices 200, control programs which are written by an external device (for example, a PC) and the like.

As shown in FIG. 4, the device management storage unit 122 is a storage region in which the version information of the control programs stored in the individual motor drive devices 200 are stored while being associated with device IDs (Identification) for identifying the motor drive devices 200. The device management storage unit 122 may store the version information to be associated with the individual motor drive devices 200 such that the version information corresponding to the control programs currently being executed in the individual motor drive devices 200 are stored while being associated with the individual motor drive devices 200, or such that the version information corresponding to all of the control programs stored in the storage regions of the individual motor drive devices 200 are stored while being associated with the individual motor drive devices 200. The device management storage unit 122 may also store the version information to be associated with the individual motor drive devices 200 such that only the latest version information of the control programs stored in the individual motor drive devices 200 are stored while being associated to the individual motor drive devices 200.

The individual functional units of the control unit 110 will be described next. The data acquisition unit 111 acquires the control programs already stored in the individual motor drive devices 200 from the individual motor drive devices 200. The data acquisition unit 111 also acquires version information of the control programs already stored in the individual motor drive devices 200 from the individual motor drive devices 200. The storage control unit 112 associates the control programs which the data acquisition unit 111 acquired from the individual motor drive devices 200 with the version information of the acquired control programs, and makes the program management storage unit 121 store them. The storage control unit 112 also associates the version information of the control programs acquired by the data acquisition unit 111 from the individual motor drive devices 200 with the device IDs of the individual motor drive devices 200, and makes the device management storage unit 122 store them. The comparison unit 114 compares the version information of the control programs acquired by the data acquisition unit 111 from the individual motor drive devices 200 with the version information of the individual control programs stored in the program management storage unit 121.

The display control unit 115 makes the display unit 130 display, for example, the version information of the control programs stored in the individual motor drive devices 200 which are stored in the device management storage unit 122 and the latest version information from among the control programs stored in the program management storage unit 121. Moreover, for example, in cases where, as a result of the comparison made by the comparison unit 114, the version information of the control program stored in a certain motor drive device 200 which is stored in the device management storage unit 122 does not agree with the latest version information of the control program stored in the program management storage unit 121, the display control unit 115 may make the display unit 130 display the version information of the control program stored in said motor drive device 200 which is stored in the device management storage unit 122 along with the latest version information of the control program stored in the program management storage unit 121. The reception unit 116 receives instruction data of a user from the input unit 140. For example, the instruction data may be input through a display screen displayed on the display unit 130.

The program determination unit 117 identifies the motor drive device 200 based on the instruction data received in the reception unit 116, for example, and determines to write the control program based on the instruction data into the identified motor drive device 200. The program determination unit 117 may also determine to write the control program having the latest version information into the identified motor drive devices 200, based on, for example, the instruction data received in the reception unit 116. The program determination unit 117 may further determine to, for example, write the control program having the version information received in the reception unit 116 into all the motor drive devices 200. The program determination unit 117 may further determine to, for example, write the control program having the latest version information stored in the program management storage unit 121 into the motor drive device 200 which does not have said control program, not being based on the instruction from the reception unit 116. The program writing unit 118 writes the control program determined by the program determination unit 117 into the determined motor drive device 200.

The display unit 130 is, for example, a display device such as an LCD (Liquid Crystal Display). The input unit 140 is, for example, an input device such as a keyboard or a mouse. The communication unit 150 communicates with the motor drive devices 200 through the connection interface.

The motor drive device will be described next. The motor drive device 200 is a device which drives motors for individual axes in order to perform predetermined machining, such as cutting, on a work, such as a part, based on, for example, a position instruction which is output by the numerical controller 100.

The motor drive device 200 includes a control unit 210, a storage unit 220 and a communication unit 250. The control unit 210 executes various types of programs including the control program stored in the storage unit 220 so as to comprehensively control the motor drive device 200. In the present embodiment, the control unit 210 includes, as functional units based on the programs stored in the storage unit 220, a data feed unit 211, a writing permission unit 212, and a switching unit 213. The motor drive device 200 includes, in addition to these functional units, functional units which are specific to the motor drive device 200, but since they are known to a person skilled in the art, the description thereof will be omitted. Before describing the individual functional units in the control unit 210, the storage unit 220 will be described.

The storage unit 220 is, for example, a nonvolatile memory. The storage unit 220 includes a program storage unit 221 which stores the control program including the program executed by the control unit 210. The control program is the control program which controls the motor drive device 200. The program storage unit 221 may include a first region 222 and a second region 223.

The first region 222 and the second region 223 are both storage regions for storing the control programs. In general, the program storage unit 221 of the motor drive device 200 has a small storage region. Hence, the control program is stored in at least one of the first region 222 and the second region 223. The first region 222 and the second region 223 may have the same size. The control program may be stored in either one of the first region 222 and the second region 223, or may be stored in both of them. However, when the control program is stored in both of them, control programs with different version information are stored in the first region 222 and the second region 223, respectively.

The program storage unit 221 is not limited to the configuration wherein two storage regions (the first region 222 and the second region 223) are provided. A plurality of m regions which are equal to or more than 2 (2≤m) may be included. In this case, control programs for m generations can be stored in the program storage unit 221. When the control program is written, the control program may be written into a storage region in which a control program of an old version information is stored, using a round robin method. More specifically, it is possible to manage generation information such as by storing the generation information in individual storage regions, for example, such that the storage region of the current generation where the control program of the currently used version is stored, the storage region of the preceding generation where the control program of the previously used version is stored, and the like can be distinguished.

The individual functional units included in the control unit 210 will be described next. The data feed unit 211 feeds out, according to a request from the numerical controller 100, the body of a control program and/or the version information of the program stored in the program storage unit 221. When a plurality of control programs are stored in the program storage unit 221, the data feed unit 211 may feed out the bodies of the plurality of control programs and/or the version information of these programs, or may feed out the body of the control program with the latest version information and/or the version information of this program. The writing permission unit 212 permits the control program designated in the writing instruction received from the numerical controller 100 to be written into the program storage unit 221. In this way, the control program is written into the program storage unit 221. The switching unit 213 switches the control program to be executed from among a plurality of control programs stored in the program storage unit 221. More specifically, the switching unit 213 switches the generations of the first region 222 and the second region 223. In other words, the switching unit 213 updates the generation information such that the region in which the currently executed control program is stored is designated as the preceding generation and that the region into which the control program is newly written is designated as the current generation. The timing of the switching may be the time when the writing is completed, or may be the time when the control program being executed is placed on standby. If the writing of the control program fails, the switching unit 213 does not perform the switching, and maintains the currently executed control program as the current generation. The communication unit 250 communicates with the numerical controller 100 through the connection interface.

The outline of the individual devices in the numerical control system 1000 and the functional blocks included in the numerical controller 100 and the motor drive device 200 has been described above. The individual devices included in the numerical control system 1000 can be realized by hardware, software, or a combination thereof. Here, realization by software means that the individual devices are realized by the reading and executing of programs with a computer. As a specific example, the numerical controller 100 can be realized by incorporating application software for realizing the present embodiment into a general numerical controller. The motor drive device 200 can be realized by incorporating application software for realizing the present embodiment into a general motor drive device.

Processing Example 1

Figure 2:
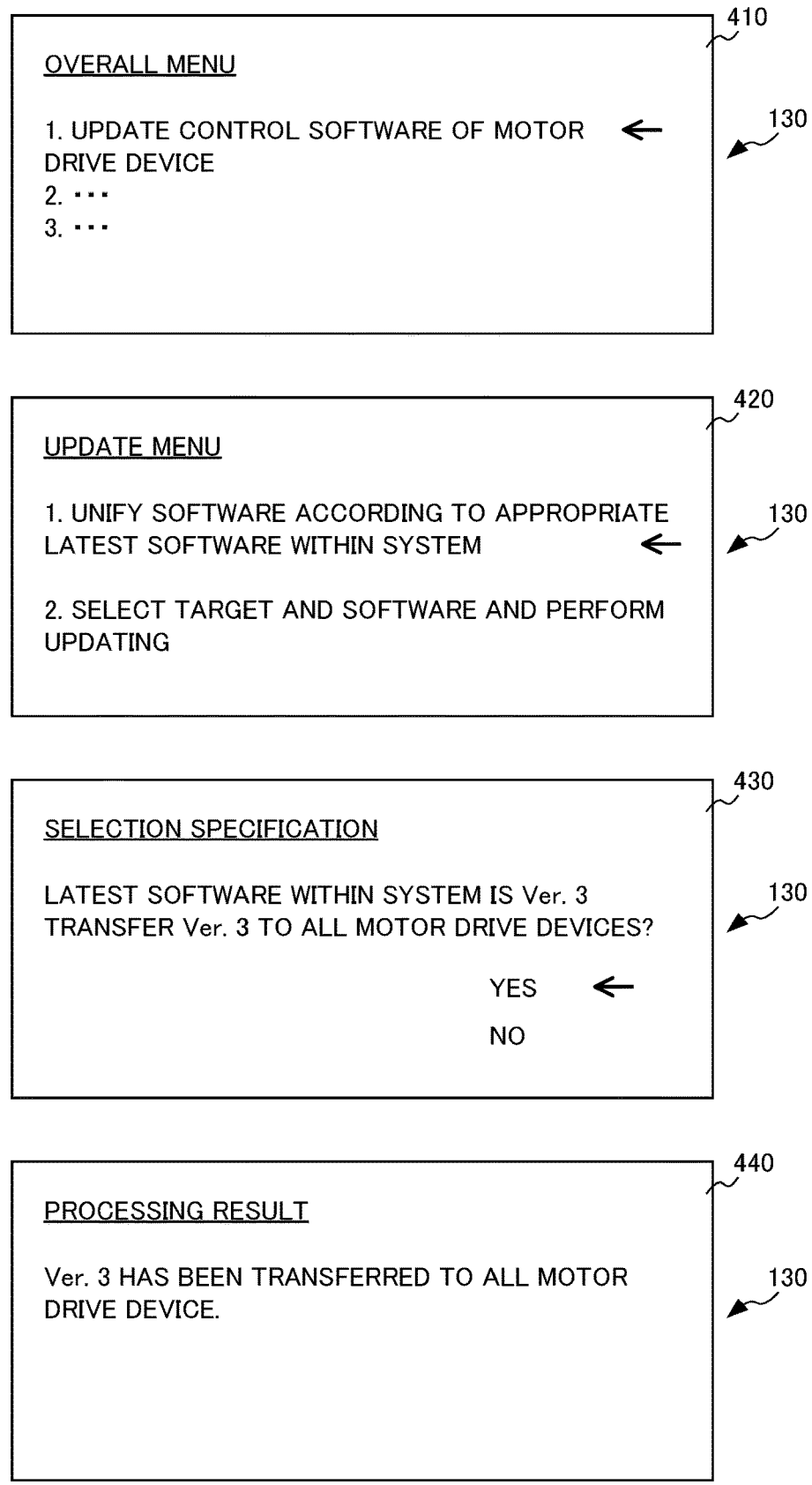
FIG. 2 is a diagram showing an example of a display screen in the numerical controller of the present embodiment.
Figure 3:
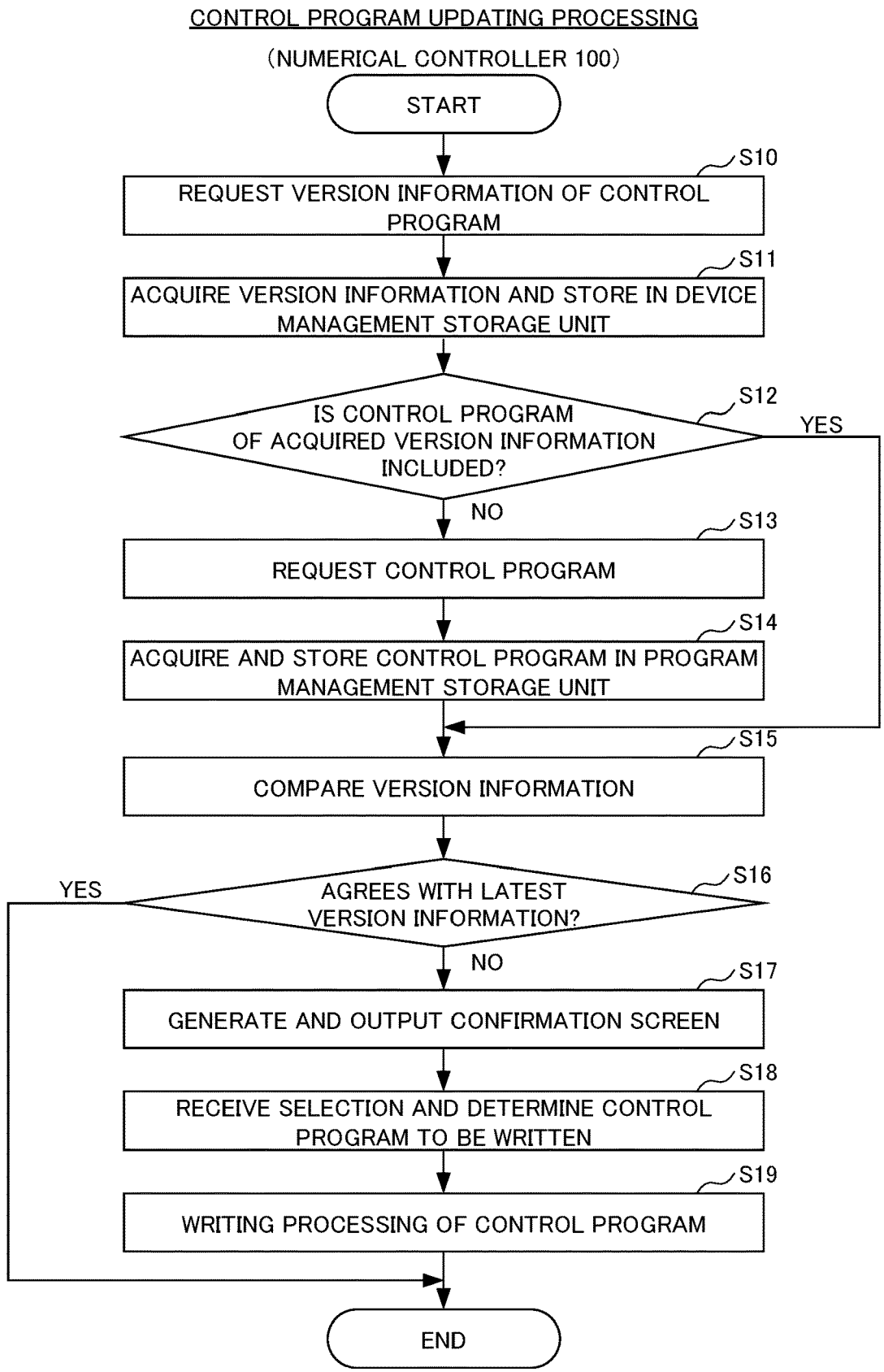
FIG. 3 is a flowchart showing control program updating processing in the numerical controller of the present embodiment.
Figure 5:
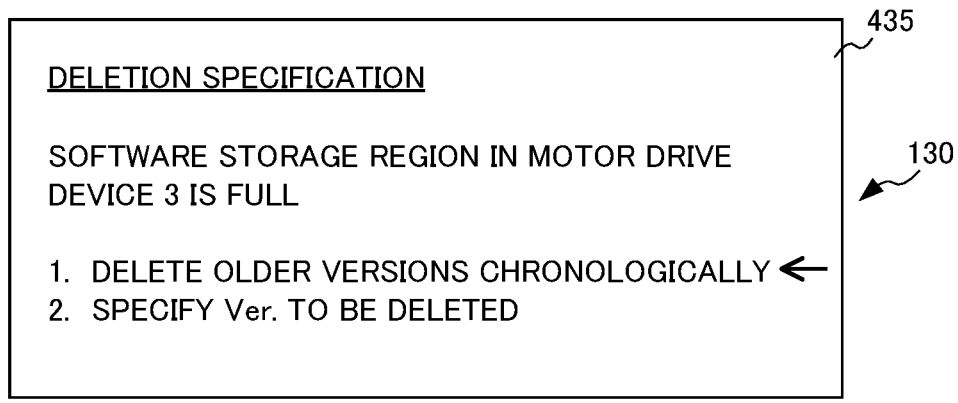
FIG. 5 is a diagram showing an example of the display screen of the numerical controller of the present embodiment.

An example of processing in cases where the numerical controller 100 according to the present embodiment is used to manage the control program of the motor drive device 200 will be described next with reference to FIGS. 2 to 5. Here, two or more motor drive devices 200 are connected to the numerical controller 100 through the connection interface so as to be able to communicate therewith. Utilizing the fact that the numerical controller 100 and the motor drive devices 200 rewrite the control program in a bidirectional manner, the processing in cases where the control program with the latest version information is written in any one of the motor drive devices 200, for example, for changing the control programs stored in the other motor drive devices 200 to the control program with the latest version information will be described. FIGS. 2 and 5 are diagrams showing examples of the display screen of the numerical controller 100 of the present embodiment. FIG. 3 is a flowchart showing control program updating processing of the numerical controller 100 of the present embodiment. FIG. 4 is a diagram showing an example of the storage unit 120 of the numerical controller of the present embodiment.

In the numerical controller 100, it is assumed that communication with the individual motor drive devices 200 is established. The numerical controller 100 starts the control program updating processing, for example, by an instruction from an operator input through the input unit 140 of the numerical controller 100. Specifically, the operator of the numerical controller 100 operates the input unit 140 such that the display control unit 115 makes the display unit 130 display, for example, an overall menu screen 410 as shown in FIG. 2. Then, following the selection operation of "update control software of motor drive device" by the operator, the control unit 110 of the numerical controller 100 starts the present processing.

The details of processing in each step will be described hereinafter with reference to FIG. 3. Here, "Snn" means step Snn. In S10, the data acquisition unit 111 of the numerical controller 100 requests the individual motor drive devices 200 to provide the version information of the control programs. The individual motor drive devices 200 receive the request from the numerical controller 100, and the data feed unit 211 feeds out the version information of the control programs stored in the first region 222 and the second region 223. Here, in cases where the control program is stored in only either one of the first region 222 and the second region 223, the data feed unit 211 feeds out the version information of the one control program that is stored. On the other hand, in cases where the control programs are stored in both of the first region 222 and the second region 223, the data feed unit 211 may feed out the version information of both of the control programs, or may only feed out the latest version information.

In S11, the data acquisition unit 111 acquires the version information fed out by the individual motor drive devices 200. Then, the storage control unit 112 associates the acquired version information with the device IDs of the motor drive devices 200 from which the version information was acquired, and stores them in the device management storage unit 122. The device management storage unit 122 shown in FIG. 4 has gone through the storage processing in S11. In the example of FIG. 4, the numerical controller 100 is connected to five motor drive devices 200, that is, the motor drive devices 200-1 to 200-5 whose device IDs correspond to SID01 to SID05 so as to be able to communicate therewith. Since the motor drive device 200-5 is a device which is newly introduced, for example, the version information of the control program is newer than those of the other motor drive devices 200.

In S12, the comparison unit 114 compares the version information of the individual control programs stored in the program management storage unit 121 with the version information of the control programs stored in the individual motor drive devices 200 which are stored in the device management storage unit 122. Then, the comparison unit 114 determines whether or not the program management storage unit 121 stores the control programs corresponding to the version information of the control programs stored in the individual motor drive devices 200 which are stored in the device management storage unit 122. When the control programs with the version information acquired from the individual motor drive devices 200 are stored in the program management storage unit 121 (S12: YES), the comparison unit 114 proceeds the processing to S15 whereas, when said control programs are not stored in the program management storage unit 121 (S12: NO), the comparison unit 114 proceeds the processing to S13. For example, the program management storage unit 121 shown in FIG. 4 stores the control programs of which the version information of the control programs are "1" and "2". However, the program management storage unit 121 does not store the control program with the version information "3" which is stored in the device management storage unit 122. Hence, in S12, it is determined as NO, and the processing proceeds to S13.

In S13, the data acquisition unit 111 extracts from the device management storage unit 122 the version information which is stored in the device management storage unit 122 but not in the program management storage unit 121, and requests the motor drive device 200 corresponding to the extracted version information to provide the body of the control program with the extracted version information. In the motor drive device 200 which receives the request from the numerical controller 100, the data feed unit 211 feeds out the control program of which the corresponding version information stored in the program storage unit 221 is "3".

To describe by way of the specific example shown in FIG. 4, the data acquisition unit 111 extracts "3" as the version information which is stored in the device management storage unit 122 but not in the program management storage unit 121. Then, the data acquisition unit 111 requests the motor drive device 200-5 with the device ID SID05 which corresponds to the version information "3" to provide the body of the control program with the version information "3". In the motor drive device 200-5 which receives the request from the numerical controller 100, the data feed unit 211 feeds out the control program stored in the program storage unit 221 with the version information "3".

In S14, the data acquisition unit 111 acquires the control program fed out by the corresponding motor drive device 200. Then, the storage control unit 112 stores the acquired control program in the program management storage unit 121 while associating it with the version information. In this way, the control program with the version information "3" is added and stored in the program management storage unit 121 shown in FIG. 4.

In S15, the comparison unit 114 compares the version information of the individual control programs stored in the program management storage unit 121 with the version information of the control programs stored in the individual motor drive devices 200 which are stored in the device management storage unit 122. In S16, the comparison unit 114 determines whether or not the version information of the control programs stored in the individual motor drive devices 200 which are stored in the device management storage unit 122 agree with the latest version information of the control programs stored in the program management storage unit 121. When they agree with each other (S16: YES), the numerical controller 100 completes the present processing. The case where they agree with each other means that the control programs of the latest version information are stored in the individual motor drive devices 200, and thus it is not necessary to write the control program into the motor drive device 200. On the other hand, when they do not agree with each other (S16: NO), the comparison unit 114 proceeds the processing to S17. In S17, the display control unit 115 generates a screen with which the operator performs confirmation and makes the display unit 130 display the screen.

For example, as shown in FIG. 4, the versions of the control programs of the motor drive devices 200-1 to 200-4, other than the motor drive device 200-5, do not have latest version information which is "3" (NO in S16). Hence, the display control unit 115 makes the display unit 130 display an update menu screen 420 shown in FIG. 2. The operator references the update menu screen 420 and determines a method of updating the control program. Here, in the update menu screen 420, the operator selects "unify software according to appropriate latest software within system," and thus the display control unit 115 subsequently displays a selection specification screen 430. The selection specification screen 430 is intended for making an inquiry with regards to the latest version information of the control program and whether or not it should be transferred to all the motor drive devices 200. The operator selects "yes" in the selection specification screen 430, and thus the control program with the version information "3" is transferred to the motor drive devices 200-1 to 200-4 that do not have the control program with the version information "3".

In S18, the reception unit 116 receives the selection operation performed by the operator through the input unit 140. Then, the program determination unit 117 determines that the control program with the version information corresponding to the selection operation received in the reception unit 116 should be written into the motor drive devices 200. In S19, the program writing unit 118 writes the control program with the determined version information into all the motor drive devices 200 which do not have the control program with said version information. Thereafter, the display control unit 115 makes the display unit 130 display, for example, a processing result screen 440 shown in FIG. 2, and completes the present processing.

In the motor drive devices 200 whose control programs are targets to be updated (in the example of FIG. 4, the motor drive devices 200-1 to 200-4), the writing permission unit 212 permits the writing of the control program into the program storage unit 221 based on the request from the numerical controller 100. In this way, the control program is written into the program storage unit 221 of the motor drive devices 200. Here, the motor drive devices 200 previously have a writing program for writing the control program, and thus the control program is written into the program storage unit 221 with the writing program.

The region into which the control program is written is either of the first region 222 or the second region 223 into which the control program is not written. Here, in cases where the control program is written in both of the first region 222 and the second region 223, the control unit 210 may automatically determine that the region into which the control program should be written is either of the first region 222 or the second region 223 into which a control program with an older version information is written. The display unit 130 of the numerical controller 100 may be made to display a deletion specification screen 435 as shown in FIG. 5 so as to make the operator specify a deletion method.

Then, the switching unit 213 switches between the control program currently being executed and the control program written by the numerical controller 100. In other words, the control program to be executed is switched from the control program currently being executed to the control program newly written in the motor drive device 200. More specifically, the switching unit 213 switches the generations of the first region 222 and the second region 223. In other words, the switching unit 213 updates the generation information such that the region in which the currently executed control program is stored is designated as the preceding generation and that the region into which the control program is newly written is designated as the current generation. The timing of the switching may be the time when the writing is completed, or may be the time when the control program being executed is placed on standby. When the writing of the control program fails, the switching unit 213 does not perform the switching, and maintains the currently executed control program as the current generation.

Processing Example 2

In processing example 1, the case where the version information of the control program which is written into all the motor drive devices 200 is specified is described; however, in addition to the version information of the control programs, the motor drive devices 200 into which they are written can be individually specified to write the control programs based on the specification into the motor drive devices 200 based on the specification. In processing example 2, an example of an operation where the version information of the control programs and the motor drive devices 200 are individually specified will be described. In the following description, the details of the processing which are the same as those in processing example 1 will be omitted, and processing which are different from processing example 1 will be described.

Figure 6:
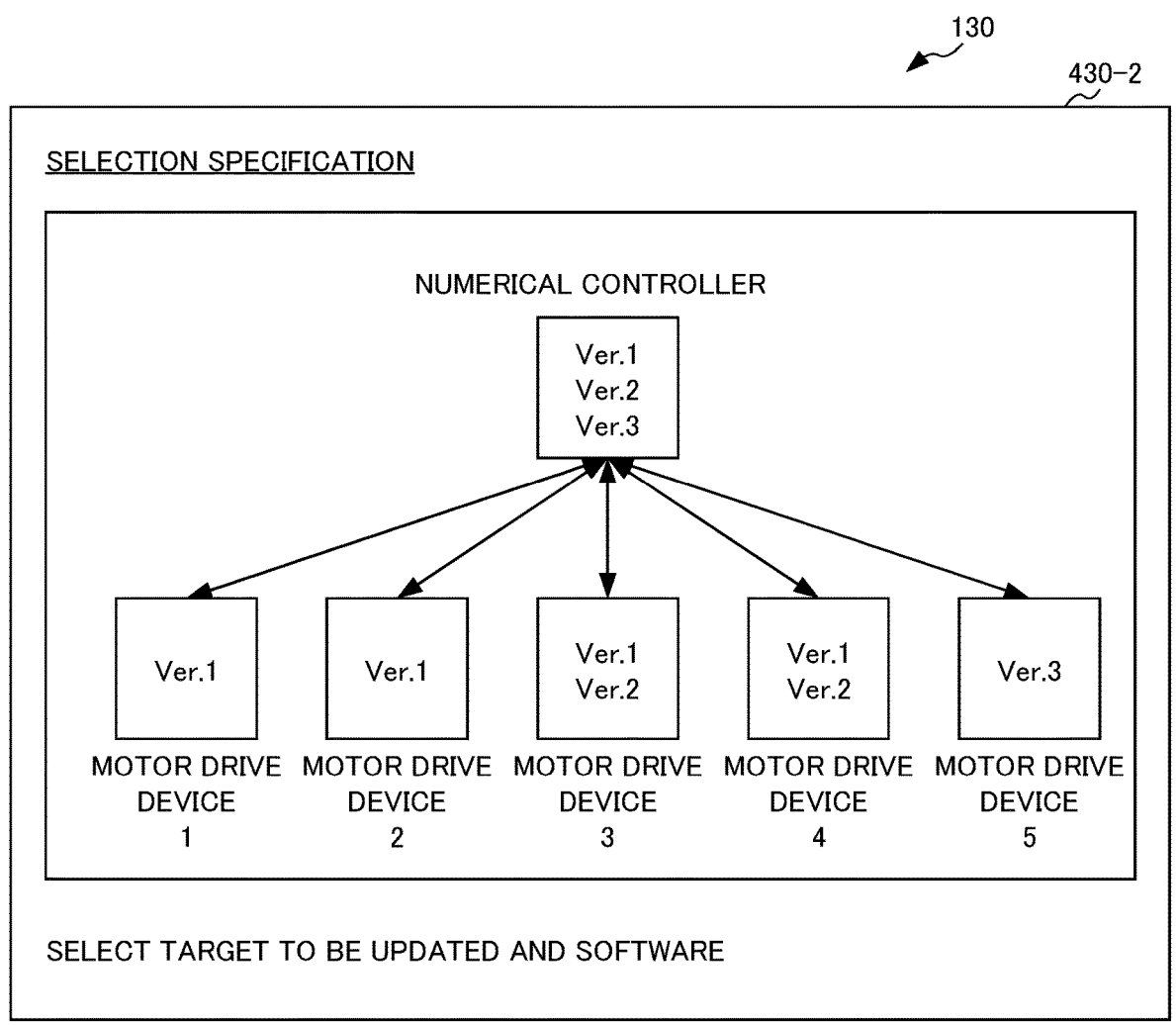
FIG. 6 is a diagram showing another example of the display screen of the numerical controller of the present embodiment.

FIG. 6 is a diagram showing another example of the display screen in the numerical controller 100 in the present embodiment. In processing example 2, for example, in S17 of FIG. 3, when the update menu screen 420 shown in FIG. 2 is displayed on the display unit 130, the operator selects "select target and software and perform updating" in the update menu screen 420, and the display control unit 115 makes the display unit 130 display a selection specification screen 430-2 shown in FIG. 6. Hence, with the operator referencing the display unit 130 and specifying the names of the motor drive devices 200 and the version information of the control programs one by one, in S18 of FIG. 3, the program determination unit 117 determines that the control programs with the version information corresponding to the selection operation received in the reception unit 116 should be written into the motor drive devices 200 received in the reception unit 116.

As described above, the operator specifies the version information of the control programs and the motor drive devices 200, and thus the program writing unit 118 of the numerical controller 100 can write the control programs based on the specification into the motor drive devices 200 based on the specification. Hence, the operator is able to write control programs of different version information into each of the motor drive devices 200 while performing confirmation.

As described above, in the numerical control system 1000, since the numerical controller 100 and the individual motor drive devices 200 can perform bidirectional communication of the control programs, the motor drive devices 200 can transmit the control programs to the numerical controller 100, and the numerical controller 100 can transmit the control programs to the motor drive devices 200.

In the numerical control system 1000, since the numerical controller 100 stores the control programs stored in the individual motor drive devices 200 including the version information, the numerical controller 100 can perform generation management of the control programs of the motor drive devices 200. This utilizes the fact that the storage size of the program storage unit 221 where the control programs are stored is small, whereas the storage size of the numerical controller 100 is relatively large. Hence, the numerical controller 100 can play the role of backing up the control programs of the motor drive devices 200.

In the numerical control system 1000, if the control program with the latest version information is present within the numerical control system 1000 (the numerical controller 100 or the motor drive devices 200), the control programs can be self-updated to the control programs of the latest version information within the numerical control system 1000 without connecting external devices and the like.

In the motor drive devices 200, the program storage unit 221 has at least two regions for storing the control programs, and thus, even when the writing of the control programs by the numerical controller 100 fails, the previously stored control programs can be executed, with the result that it is possible to perform recovery at an early stage when the writing fails.

Programs such as the control programs used in the present invention can be stored using various types of non-transitory computer readable media and be supplied to a computer. The non-transitory computer readable media include various types of tangible storage media. Examples of the non-transitory computer readable media include magnetic recording media (flexible discs, magnetic tapes, and hard disc drives, for example), magneto-optical recording media (magneto-optical discs, for example), CD-ROM (Read Only Memory), CD-R, CD-R/W, semiconductor memories (mask ROM, PROM (Programmable ROM), EPROM (Erasable PROM), flash ROM, and RAM (random access memory), for example). The programs may also be supplied by various types of transitory computer readable media. Examples of the transitory computer readable media include electrical signals, optical signals, and electromagnetic waves. The transitory computer readable media can supply the programs to a computer through wired communication paths such as electric wires and optical fibers, or wireless communication paths.

Although the embodiment described above is a preferred embodiment of the present invention, the scope of the present invention is not limited only to the embodiment described above, and the present invention can be practiced in forms in which various modifications are made without departing from the spirit of the present invention.

(Variation 1)

In the embodiment described above, a configuration in which the numerical controller 100 is connected to a plurality of motor drive devices 200 so as to be able to communicate therewith is described; however, it is not limited thereto. The numerical controller 100 may be connected to one motor drive device 200 so as to be able to communicate therewith.

(Variation 2)

In the embodiment discussed above, an example where the motor drive device 200 is newly installed and is connected to the numerical controller 100 is described; however, it is not limited thereto. The same is true for, for example, a case where the existing motor drive device 200 is replaced with a new motor drive device 200.

(Variation 3)

In the embodiment described above, a case where the control program with the latest version information is stored in the newly installed motor drive device 200 is described; however, it is not limited thereto. A configuration may be adopted in which a terminal portion is provided in the numerical controller 100, through which an external device is connected, and the control program with the latest version information is installed from the external device into the numerical controller 100. Likewise, a configuration may be adopted in which a terminal portion is provided in the motor drive device 200 through which an external device is connected and the control program with the latest version information is installed from the external device into the motor drive device 200.

(Variation 4)

In the embodiment discussed above, an example where the model numbers (type information) of the motor drive devices 200 are the same (the same type) is described; however, it is not limited thereto. The model numbers of the motor drive devices 200 may be different. In such a case, the numerical controller 100 stores the control program, associating the control program with the model number information of the applicable motor drive device 200. Then, the control program with the latest version information may be transferred according to the model number of the motor drive device 200.

(Variation 5)

In the specific example of the embodiment discussed above, a configuration in which the operator performs the specification so as to start the control program updating processing is described; however, it is not limited thereto. The control program updating processing may be started at a predetermined timing, such as once per month. In such a case, for example, if it is designated that the software is unified according to an appropriate software within the system, the control program with the latest version information can be automatically applied to all the motor drive devices 200 in the numerical control system 1000 without the selection operation being performed by the operator.

(Variation 6)

In the specific example of the embodiment discussed above, a case is described where the numerical controller 100 first acquires the version information of the control programs stored in the individual motor drive devices 200, and if the numerical controller 100 does not have the control program with the corresponding version information, the then numerical controller 100 requests the corresponding motor drive device 200 to provide the body of the control program with said version information; however, it is not limited thereto. The numerical controller 100 may simultaneously acquire the control programs and the version information stored in the individual motor drive devices 200.

(Variation 7)

The embodiments and variants discussed above are described using the motor drive device 200 serving as the "device included in an industrial machine" as an example; however, it is not limited thereto. The present invention can also be applied to devices included in industrial machines other than the motor drive device (that is, machines such as machine tools and industrial robots (including various machines such as service robots, forging press machines, and injection molding machines)), for example, laser oscillators and the like included in laser machines incorporated in machine tools and the like. In such a case, instead of the control program of the motor drive device 200, the present invention can be applied to the control program of the corresponding device (for example, laser oscillators and the like).

EXPLANATION OF REFERENCE NUMERALS 100 numerical controller
110, 210 control unit
111 data acquisition unit
112 storage control unit
114 comparison unit
115 display control unit
116 reception unit
117 program determination unit
118 program writing unit
120, 220 storage unit
121 program management storage unit
122 device management storage unit
130 display unit
140 input unit
200 motor drive device
211 data feed unit
212 writing permission unit
213 switching unit
221 program storage unit
222 first region
223 second region
1000 numerical control system

What is claimed is:

1. A numerical controller which is connected to a plurality of devices included in an industrial machine so as to be able to communicate therewith and which controls the plurality of devices, the numerical controller comprising:
a program management memory which stores a control program that is written into the devices and is executable, and version number information of the control program while associating the version number information with the control program;
a device management memory which stores the version number information of the control program written into each device while associating the version number information with device identification information that identifies each device;
a hardware processor configured to execute a program and cause the numerical controller to operate as:
a program writing unit which writes the control program stored in the program management memory into a memory of a predetermined device among the plurality of the devices;
a data acquisition unit which acquires from each of the devices the control program and the version number information of the control program that are already stored in each of the devices;
a storage control unit which stores the control program and the version number information of the control program acquired by the data acquisition unit in the program management memory, and stores the version number information of the control program acquired by the data acquisition unit in the device management memory while associating the version number information with the device identification information;
a comparison unit which compares the version number information of the control program acquired by the data acquisition unit with the version number information of the control program previously stored in the program management memory; and
a display control unit which controls a display to display the version number information of the control program acquired by the data acquisition unit along with the version number information of the control program previously stored in the program management memory based on the comparison result;
a reception unit which receives, through a user interface, a selection of the control program to be written based on the display of the display,
wherein the program writing unit writes the control program corresponding to the selection received in the reception unit into the memory of the predetermined device.

2. The numerical controller according to claim 1, wherein the storage control unit stores the control program and the version number information of the control program acquired by the data acquisition unit in the program management memory according to a result of the comparison by the comparison unit.

3. The numerical controller according to claim 2,
wherein the display control unit controls the display to further display a name of the device along with the version number information of the control program acquired by the data acquisition unit,
the reception unit receives, through the user interface, the selection of the control program to be written and a selection of the device into which the selected control program to be written is written, and
the program writing unit writes the control program to be written corresponding to the selection received in the reception unit into the memory, with the device received in the reception unit as the predetermined device.

4. The numerical controller according to claim 3,
wherein the program management memory is associated with type information of the device capable of executing the control program, and
the display control unit controls the display to further display the type information of the device along with the version number information of the control program previously stored in the program management memory.

5. A device which is included in the industrial machine and which is connected to the numerical controller according to claim 1 so as to be able to communicate therewith, the device comprising:
a hardware processor configured to execute a program and cause the device to operate as:
a writing permission unit which permits the memory to write the received control program according to reception of the control program from the numerical controller; and
a data feed unit which feeds out the control program stored in the memory according to a request from the numerical controller.

6. The device according to claim 5,
wherein the writing permission unit permits rewriting of the control program already stored in the memory to the received control program.

7. The device according to claim 5,
wherein the memory has such a storage size so as to be able to store a plurality of the control programs,
the writing permission unit permits not only the control program already stored in the memory but also the received control program to be written, and
the hardware processor of the device is further configured to operates as a switching unit which switches the control program to be executed to the control program permitted by the writing permission unit to be written.

8. A numerical control system comprising:

a device included in an industrial machine; and a numerical controller which is connected to the device so as to be able to communicate therewith and which controls the device, wherein the numerical controller includes:

a program management memory which stores a control program that is written into the device and is executable; and a hardware processor configured to execute a program and cause the numerical controller to operate as:

a program writing unit which writes the control program stored in the program management memory into a memory of the device;

a data acquisition unit which acquires from the device a control program that is already stored in the device; and a storage control unit which stores the control program acquired by the data acquisition unit in the program management memory, the a storage control unit storing the control program and a version number information of the control program acquired by the data acquisition unit in the program management memory, a comparison unit which compares the version number information of the control program acquired by the data acquisition unit with a version number information of the control program previously stored in the program management memory, and a display control unit which controls a display to display the version number information of the control program acquired by the data acquisition unit along with the version number information of the control program previously stored in the program management memory based on the comparison results, the memory of the device has such a storage size so as to be able to store a plurality of the control programs, and the device includes:

a hardware processor configured to execute a program and cause the device to operate as:

a writing permission unit that permits, according to reception of the control program from the numerical controller, not only the control program already stored in the memory but also the received control program to be written;

a switching unit which switches the control program to be executed to the control program permitted by the writing permission unit to be written; and a data feed unit which feeds out the control program stored in the memory according to a request from the numerical controller.

\* \* \* \* \*